United States Patent
Cariou

(10) Patent No.: US 11,941,325 B2
(45) Date of Patent: Mar. 26, 2024

(54) 3D MODELED OBJECT OF A PHYSICAL PROTOTYPE OF A PRODUCT

(71) Applicant: DASSAULT SYSTEMES, Velizy Villacoublay (FR)

(72) Inventor: Delphine Cariou, Aix-en-Provence (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 102 days.

(21) Appl. No.: 17/135,183

(22) Filed: Dec. 28, 2020

(65) Prior Publication Data

US 2021/0200907 A1 Jul. 1, 2021

(30) Foreign Application Priority Data

Dec. 30, 2019 (EP) .................................. 19306788

(51) Int. Cl.
*G06T 17/20* (2006.01)
*G06F 30/10* (2020.01)
*G06F 30/15* (2020.01)
*G06F 119/10* (2020.01)

(52) U.S. Cl.
CPC .............. *G06F 30/10* (2020.01); *G06T 17/20* (2013.01); *G06F 30/15* (2020.01); *G06F 2119/10* (2020.01)

(58) Field of Classification Search
CPC .......... G06F 30/10; G06F 30/15; G06F 30/20; G06F 2119/10; G06F 2111/04; G06T 17/20; G06T 17/205; G06T 7/11; G06T 2207/30268; G06K 9/6218
See application file for complete search history.

(56) References Cited

U.S. PATENT DOCUMENTS

| | | | | |
|---|---|---|---|---|
| 5,552,992 A | * | 9/1996 | Hunter | G05B 19/4099 700/118 |
| 6,996,505 B1 | * | 2/2006 | Edelsbrunner | G06T 17/205 703/2 |
| 7,821,513 B2 | * | 10/2010 | Bae | G06F 30/00 345/418 |
| 8,004,517 B1 | * | 8/2011 | Edelsbrunner | G06T 17/20 345/611 |

(Continued)

OTHER PUBLICATIONS

Cohen-Steiner, D., et al. "Variational Shape Approximation" ACM SIGRAPH, pp. 905-914 (2004) (Year: 2004).*

(Continued)

*Primary Examiner* — Jay Hann
(74) *Attorney, Agent, or Firm* — Oblon, McClelland, Maier & Neustadt, L.L.P.

(57) ABSTRACT

A computer-implemented method for designing a 3D modeled object of a physical prototype of a product. The 3D modeled object includes a wireframe based on at least one character line. The method includes computing a segmentation of an obtained mesh, therefore obtaining at least two regions from the obtained mesh and at least one boundary polyline between the at least two regions. Then the method comprises transforming each of the at least one boundary polyline in at least one character line. The method further comprises computing a network of the at least one character line, the network of the at least one character line forming the wireframe of the 3D modeled object.

13 Claims, 14 Drawing Sheets

(56) References Cited

U.S. PATENT DOCUMENTS

2007/0188490 A1* 8/2007 Kanai .................. G06T 17/20
345/423

OTHER PUBLICATIONS

Attene, M., et al. "Hierarchical mesh segmentation based on fitting primitives" Visual Computing, vol. 22, pp. 181-193 (2006) (Year: 2006).*
Wang, J., et al. "A framework for 3D model reconstruction in reverse engineering" Computers & Industrial Engineering, vol. 63, pp. 1189-1200 (2012) (Year: 2012).*
Lavoue Get al: "Semi-sharp subdivision surface fitting based on feature lines approximation", Computers and Graphics, vol. 33, No. 2, Feb. 6, 2009 (Feb. 6, 2009), pp. 151-161, XP026034179.
Joel II Daniels et al: "Robust Smooth Feature Extraction from Point Clouds", IEEE International Con Ference on Shape Modeling and Applications, Jun. 13, 2007 (Jun. 13, 2017), pp. 123-136, XP031116740.
William B Thompson et al., "Feature-Based Reverse Engineering of Mechanical Parts", IEEE Transactions on Robotics and Automation, vol. 15, No. 1, Feb. 1, 1999 (Feb. 1, 1999), XP011053370.
European Search Report dated Jun. 8, 2020, corresponding to European application No. 19306788.1.

* cited by examiner

3D MODELED OBJECT OF A PHYSICAL PROTOTYPE OF A PRODUCT

CROSS-REFERENCE TO RELATED APPLICATIONS

This application claims priority under 35 U.S.C. § 119 or 365 to European Application No. 19306788.1, filed Dec. 30, 2019. The entire contents of the above application are incorporated herein by reference.

FIELD

The disclosure relates to the field of computer programs and systems, and more specifically to a method, system and program for designing a 3D modeled object of a physical prototype of a product, the 3D modeled object comprising a wireframe based on at least one character line.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systémes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context, the product design is of high importance. Product design aims at building a virtual 3D model as close as possible to a physical prototype, which is considered as master model by the designers. Such process is commonly used on free form prototypes (physical mock-ups) in aerospace, automobile, marine, consumer goods, and consumer packaged goods industries. In some industry, companies focus on the character lines quality during the reverse engineering process. These companies are looking for ways to make their product quieter and more stable.

FIG. 1 and FIG. 2 show screenshots of simulation results on a prototype that represent the impact of the quality on the character lines on the aerodynamism of a car. FIG. 1 shows a first aerodynamism simulation result for an original design. FIG. 2 shows a second aerodynamism simulation result after character lines of the original design have been modified. The simulation result is different.

Similarly, FIG. 3 and FIG. 4 show a screenshots of simulation results on a prototype that represent the impact of the quality on the character lines on the noise caused by the body of a car. The result of the simulation on FIG. 4 is improved with respect the one of FIG. 3 as one or more character lines have been modified by an acoustic designer engineer.

A digital reconstruction of the prototype is required. Once the results on the prototype are satisfactory, the digital reconstruction process (also referred to as "network approach") generally comprises the following manual steps:

- a prototype is realized by a designer respecting aerodynamism and noise criterion;
- the prototype is measured using 3D scanning technologies to obtain the associated cloud of points;
- the mesh of variable quality derived from the digitalization of the prototype is cleaned, repaired and optimized;
- the mesh is analyzed to highlight its shapes and character lines. The character lines are the main paths on which the boundaries of the surfaces has to rest on. The goal of this analysis is to reproduce the surfaces of the product;
- a set of curves is created by the user, following the character lines based on previous analysis. These curves represent the wireframe of the product and figuring the future surface boundaries; and
- each cell of the network is filled by a surface respecting a max deviation with the mesh.

In these steps, usual process to generate the character lines is manually realized by the user. This can be made either based on the user's expertise and understanding of the object shape or by using the result of the mesh analysis step (colored map) as visual guide. The user draws the character curves by picking on the mesh to insert the control points. The final curve has to reproduce the shape of the mesh and respect a max deviation with the mesh. Curvature analysis maps help the user to distinguish the shape of the mesh. Deviation analysis tools are provided to help him to validate or edit the curve for a best fit into the mesh.

The quality of the curves directly influences the quality of the final surface. Moving from polylines extracted from the map to smooth curves fitting to the mesh is a key step in this process. Today, the decision to locate the control points of the curve, to insert a new one until a density allowing a good fitting, though preserving a smooth shape, relies on the user expertise. It is an unreproducible process.

The mainstream process for the curves generation is thus manual and requires a long time. This is clearly the most time consuming step in the overall reconstruction workflow, it represents about 70% of the total time for reconstruction. Any assisted generation here would result in significant productivity improvement. The more the user need a good quality of curves (outline contour of a car) the more the edit process is complex.

For products for which the shape is prevailing (e.g. body of the car), the user has to favor the quality of the curves. The curves have to be taut without wavering. On the contrary, for product for which the mesh is prevailing (e.g. interior of the car), the curve has to be fit on the mesh and the number of control point can be more important. The best compromise between a smooth curve and a curve fitting into the mesh depends on the user's expertise. It means that two users will not generate the same curve network or the same surfaces. Such high user variance is not what a company is looking for. The manual process is tricky and many user mistakes can influence the quality of the resulting surfaces.

For instance, several control points are often used to generate simple curves and the position of the view can hide some mesh variations. Hence, the automation of this process is a huge benefit concerning the productivity, the quality and the repeatability.

A first attempt has been made for automatically obtaining character lines of a scanned product. However, the following drawbacks exist. Firstly, the curves generation is based on a high curvature map. It is a fast method but cannot be applied for smooth character lines or smooth surface variations. This method has to be combined with an edit process to get the smooth edges and to complement manually what the system did not provide. The high curvature cannot be the only criteria. Secondly, the generated curves are the lines with high curvature of each area. Again, it is acceptable for a high curvature area but not for a smooth area where it is preferable to get the boundary of the area. This aspect matters even more if the surfaces are generated directly from the curve. Thirdly, the generated curve quality is poor. It cannot be used as a surface boundary but only to segment the shape and to bring preferred orientation for isolines. The designers desire that their product has taught lines. With this method the resulting lines are wavering. Each curve and surface has to be edit manually to correspond to a tired design. Fourthly, the surface generation method minimizes the deviation between the surface and the mesh but without giving full control to the user for the surface patchwork. Indeed, each network cell is divided into smaller patches, and the surface boundaries do not match the curves network. Fifth, the process is not function of the kind of precision the user needs.

The manual generation of lines curves such as character lines is a repetitive and painful task. The quality of the resulting curves is highly dependent of the user expertise as the perception of the user depends on the view direction on the mesh derived from the digitalization of the prototype.

Last but not least, the noise introduced by the device that computes the associated cloud of points from the prototype also causes a discrepancy between the surfaces obtained as a result of the digitalization and the surfaces of the prototype. The mesh obtained from the cloud of points bears these discrepancies with respect to the prototype. Thus, the surfaces obtained from the mesh have to be as close as possible to the mesh so that the digitalization reconstruction respects a tolerance with respect to the prototype.

Within this context, there is still a need for an improved method for designing a 3D modeled object of a physical prototype of a product wherein the 3D modeled object comprises a wireframe based on at least one character line.

SUMMARY

It is therefore provided a computer-implemented method for designing a 3D modeled object of a physical prototype of a product, the 3D modeled object comprising a wireframe based on at least one character line. The method comprises:
 providing a mesh of the 3D modeled object;
 computing a segmentation of the provided mesh, therefore obtaining at least two regions from the provided mesh and at least one boundary polyline between the at least two regions;
 transforming each of the at least one boundary polyline in at least one character line; and
 computing a network of the at least one character line, the network of the at least one character line forming the wireframe of the 3D modeled object.

The method may comprise one or more of the following:
 the computing a segmentation comprises computing a first segmentation, therefore obtaining at least two first regions from the provided mesh and at least one first boundary polyline between the at least two distinct regions;—computing a second segmentation that is performed with a higher optimizing level of segmentation compared to the first segmentation, therefore obtaining at least two second regions from the provided mesh, the at least two second regions belonging to at least one of the at least two first regions and at least one second boundary polyline between the at least two second regions;
 the computing a network comprise selecting the at least one first boundary polyline; connecting at least one second boundary polyline to the selected at least one first boundary polyline by performing a snap operation; and favoring the at least one first boundary polyline issued from the first segmentation;
 computing the segmentation of the provided mesh comprises detecting at least one master boundary polyline of the provided mesh, a master boundary polyline being a polyline having a higher curvature compared to the other polylines of the provided mesh;
 the detection of the at least one master boundary polylines comprises computing a contrast map of the mesh by applying an image filtering process on the mesh, computing a curvature evolution and identifying an extrema of this curvature evolution, computing the at least one master boundary polylines by chaining the segments resulting from previous computation;
 the computing a segmentation of the provided mesh further comprises a refined segmentation by computing a normal clustering on each region of the mesh;
 after the computing a segmentation of the provided mesh: selecting one of the at least two regions and splitting the selected region by using a map of curvature of the provided mesh and/or selecting at least two regions and merging them into a single region;
 the transforming comprises computing a smooth curve for each of the at least one boundary polyline;
 placing control points of the smooth curve, wherein the placing is performed to minimize: deviation against the smooth curve and the provided mesh, and/or the number of control points, and/or the degree of the smooth curve;
 computing an assembly of surfaces based on the wireframe, and continuity constraints for the 3D modeled object.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments will now be described, by way of non-limiting example, and in reference to the accompanying drawings, where.

DETAILED DESCRIPTION

Figure 1:
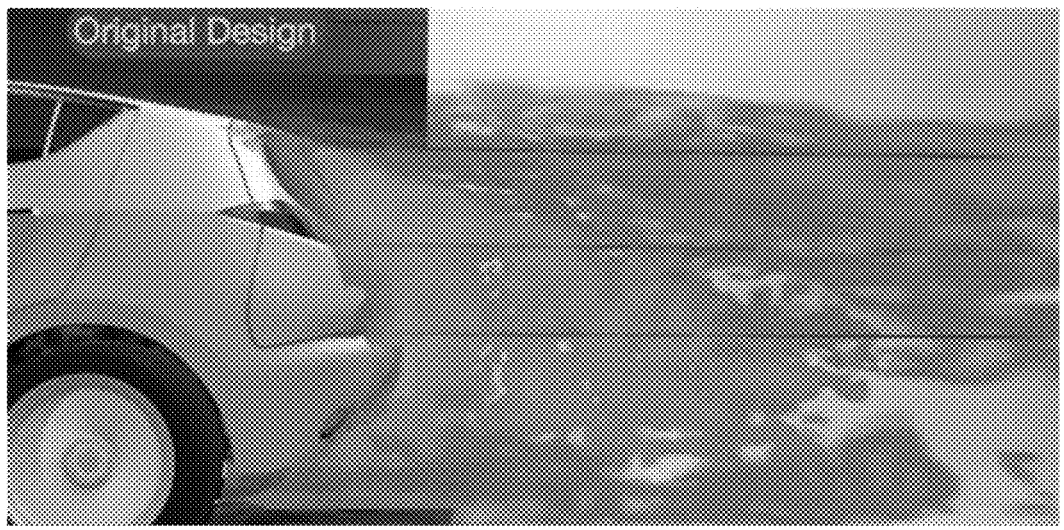
FIGS. 1 and 2 show an example of the impact of the character lines on the aerodynamism of a car.
Figure 2:
Figure 3:
FIGS. 3 and 4 show an example of the impact of the character lines on the noise caused by the body of a car.
Figure 4:
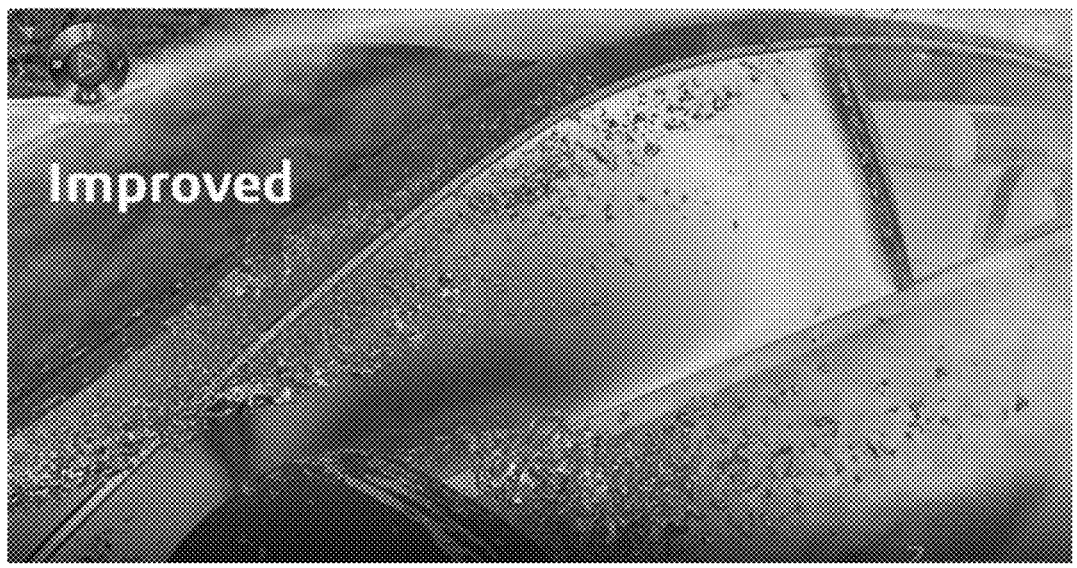
Figure 5:
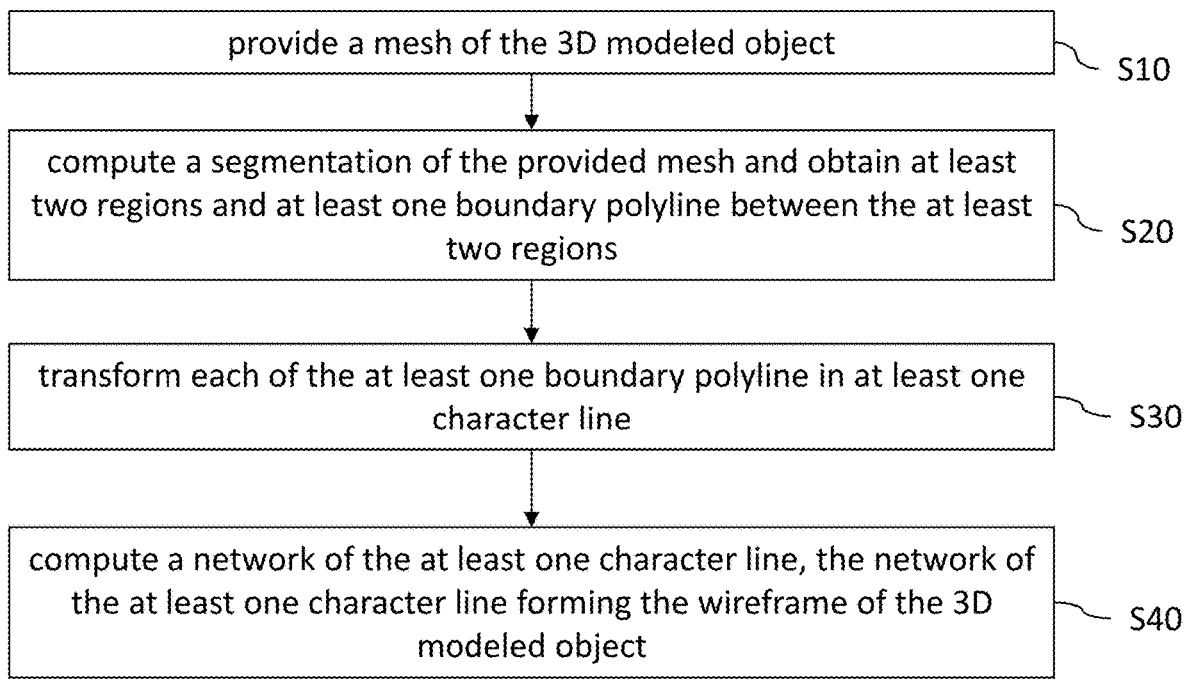
FIG. 5 shows a flowchart of an example of the method.

With reference to the flowchart of FIG. 5, it is described a computer-implemented method for designing a 3D modeled object of a physical prototype of a product, the 3D modeled object being designed comprising a wireframe based on at least one character line. The method comprises the providing of a mesh of the 3D modeled object. The mesh may be obtained from a physical prototype, e.g. by using 3D scanning technologies to obtain the associated cloud of points of the physical prototype. The method also comprises the computing of a segmentation of the provided mesh. The segmentation produces at least two distinct regions from the provided mesh. The segmentation of the 3D mesh of the prototype also comprises at least one boundary polyline that is located between the at least two distinct regions; at least a part of the border between the at least two regions provides the at least one boundary polyline. Then, the method comprises the transformation of each of the at least one boundary polyline in at least one character line. A character line is one of the lines that characterize the physical prototype, and therefore the 3D modeled object being designed. Next, the method comprises the computing of a network of the at least one character line. The network of the at least one character line forms the wireframe of the 3D modeled object. The wireframe obtained is thus comprised of the main lines (the character lines) of the product being designed.

Such a method improves designing a 3D modeled object of a physical prototype of a product, wherein the 3D modeled object comprises a wireframe based on at least one character line. The method automates the generation of curves forming the wireframe from the mesh analysis.

Notably, no manipulation of the view is required during the curves creation and no user interaction is needed to obtain a good quality of curve. Quality improvement of the wireframe is improved with a better productivity gain. In addition, the process to design the 3D modeled object is a reproducible process. The method creates the wireframe of the object based on the character lines, by the creation and an initialization of a segmented map. The combination of image filtering process and/or normal clustering and/or curvature analysis may be used.

The resulting map of the disclosure corresponds to the main lines (wireframe) of the object. The user can use it to get the main curves and generate the surfaces rested on this network. In addition, if the quality of the cloud is not too bad, the majority of the curves is generated with the present method. The user can complete the process with a few editions, most of the lines having been already computed by the method. Furthermore, the process can be specialized and be function of the precision need; for example surfaces obtained from the wireframe can be of class A, B or C.

Interestingly, the quality of the resulting curves does not depend on the view direction of the user. The projection on the mesh depends on the normal direction of the clustering and the undesirable variations are limited by the system rules: they may be calculated for a best fit of the skeleton using the less control points as possible. This reduce number of control points improve the quality of the resulting surface limiting the noise phenomena due to complex curves.

In addition, the process is best reproducible for the user. Two designers working on the same project would have obtained similar results.

Further advantages of the present disclosure will be discussed hereinafter.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, and as is already discussed, the user can complete or correct generated curves, or even create by hand curves.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systémes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systémes under the trademark SIMULIA®. Another growing CAE technique involves the modeling and analysis of complex systems composed of a plurality components from different fields of physics without CAD geometry data. CAE solutions allow the simulation and thus the optimization, the improvement and the validation of products to manufacture. Such CAE solutions are provided by Dassault Systémes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systémes under the trademark ENOVIA®.

Figure 24:
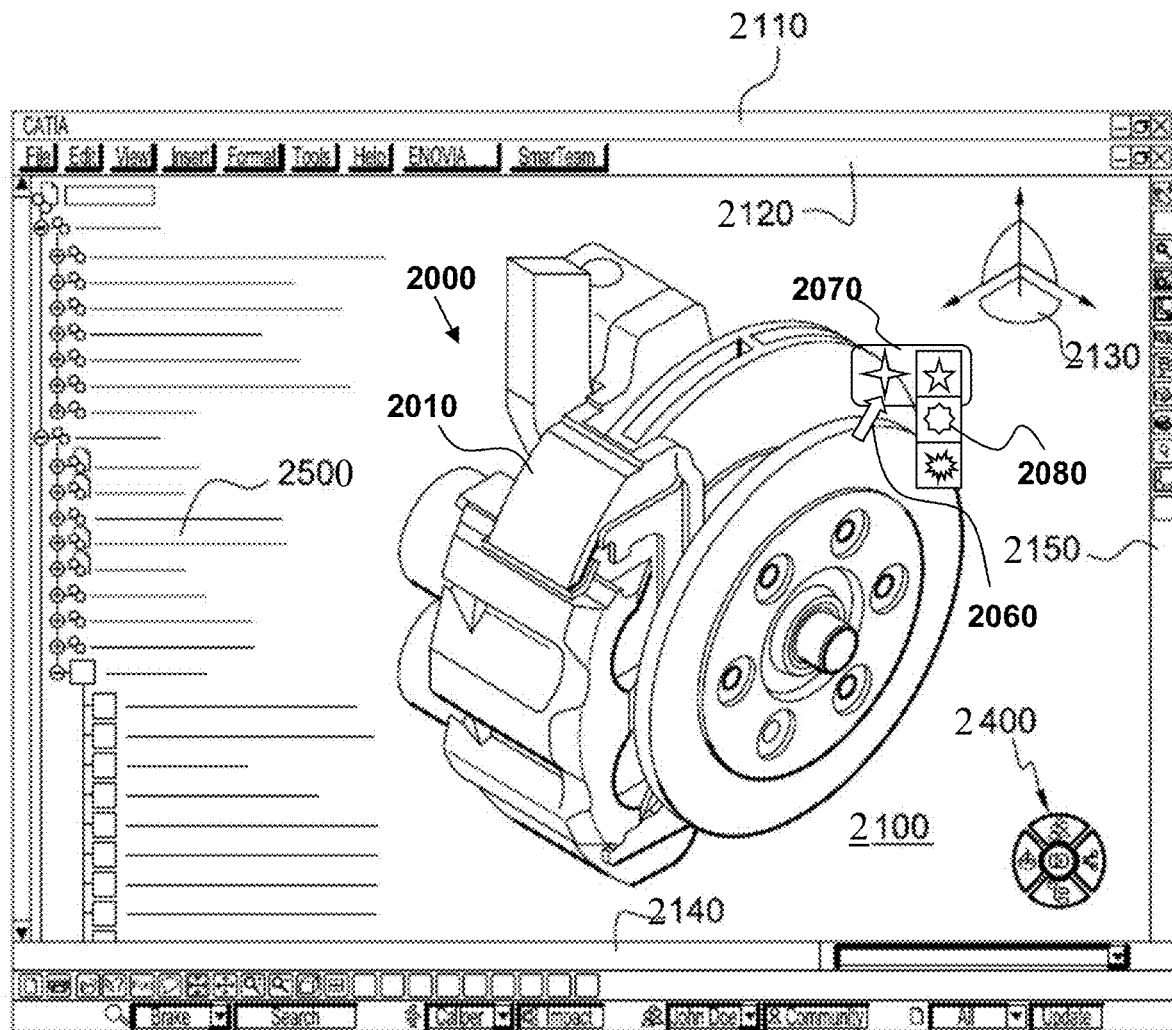
FIG. 24 show shows an example of a graphical user interface of the system.

FIG. 24 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 25:
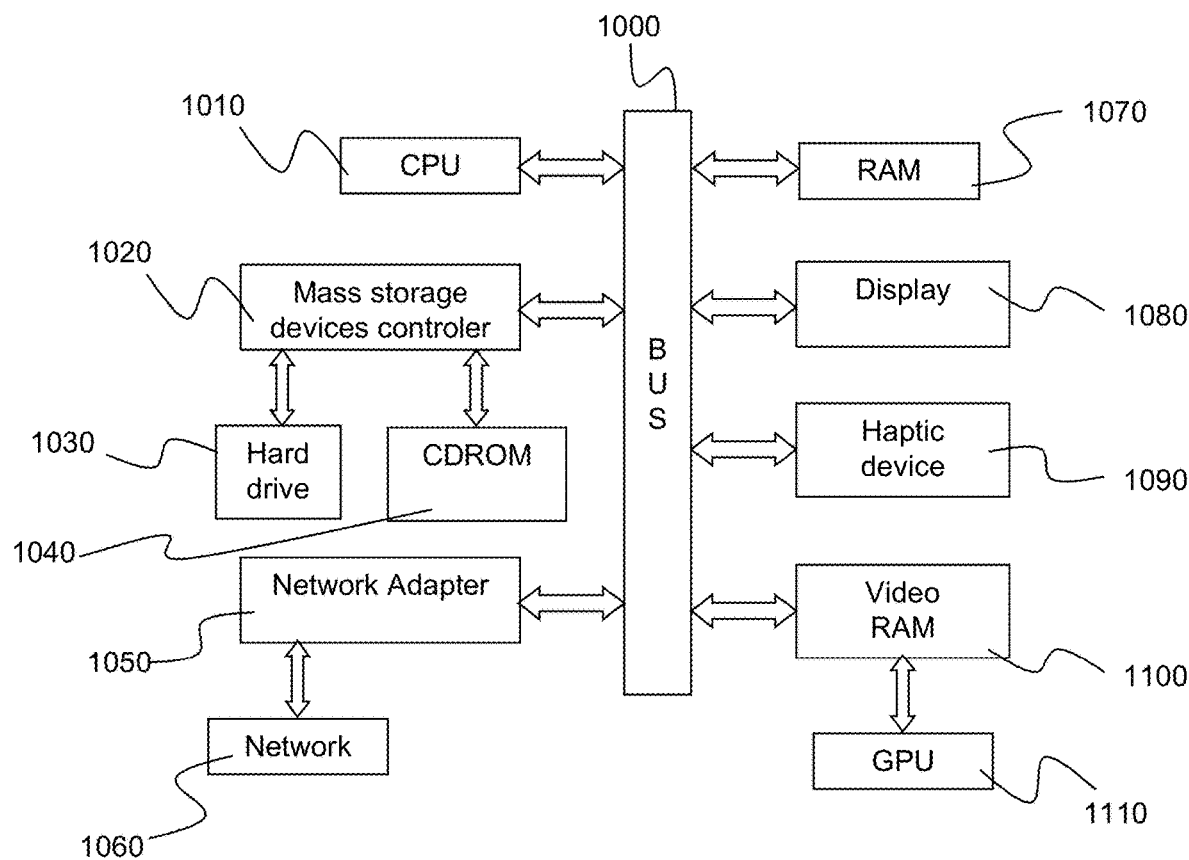
FIG. 25 shows an example of the system.

FIG. 25 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the mesh of the 3D modeled object, e.g. the mesh is obtained by using 3D scanning technologies to obtain the associated cloud of points of the physical prototype.

The method may be included in a manufacturing process, which may comprise, after performing the method, producing a physical product corresponding to the modeled object. In any case, the modeled object designed by the method may represent a manufacturing object. The manufacturing object may be a product, such as a part, or an assembly of parts. Because the method improves the design of the modeled object, the method also improves the manufacturing of a product and thus increases productivity of the manufacturing process.

Referring back to the flowchart of FIG. 5, at step S10, a mesh of the 3D modeled object is provided. The mesh comprises elements that are vertices, edges connecting vertices, and faces formed from at least three vertices. The faces are polygons, e.g. triangles. The mesh represents the shape of a prototype. The prototype is typically the mock-up of a product to be manufactured. The product belongs to various and unlimited industrial fields. Examples of industrial fields have been presented hereinabove. In the following discussions, the product to be manufactured is the body of a car, being understood that the present disclosure can apply to other industries.

The mesh may be obtained from a laser scan of the prototype. A cloud of points is thus obtained, and the cloud of points is meshed. Any technology that is able to represent a physical objects into a cloud of point can be used. Similarly, any technology that is able to mesh a cloud of point can be used. The provided mesh represents the shape of the product to be designed.

The 3D modeled object being designed comprises a wireframe (or wire-frame) based on at least one character line. This means that the physical prototype from which the provided mesh is obtained also comprises these character lines. A wireframe comprises the most important lines on which the product surfaces are rested on. The wireframe is a representation of a three-dimensional (3D) physical object used in 3D computer graphics. The representation can be a visual representation. The wireframe comprises the edges of the physical object where two surfaces meet. The wireframe is typically a 3D wire frame computer models, that is a 3D modeled object. The wireframe may be used for the construction and manipulation of solids and solid surfaces.

The wireframe is based on at least one character line. A character line is a line that characterize a product. The product is a physic or multi-physics system, which means that the product has a behavior with/within its environment, and the character line contributes to the behavior of the product in the real world. The behavior of the product can be modeled via at least one (i.e. one or more) physics model from at least one field of physics (such as one of the above examples of physics fields). This means that the characterize line has an influence on the physic model and that the results of the physic model depends (partly or totally) on the one or more character lines of the product. A real-world system or physical entity may be an electronic product, and electrical product, a mechanical product, an electromechanical product, a system of particles or an electromagnetic product. A physics model may be an electronical model, an electrical model, a mechanical model, a statistical model, a particle model, a hydraulic model, a quantic model, a geological model, an astronomic model, a chemical model, an electromagnetic model or a fluid model. A physics model may be a multi-physics models; both represent real world system or any physical entity having sub-systems related together by physical or logical relations, such as mechanical relations (e.g. corresponding to connections for transmitting a force or movement), electrical relations (e.g. corresponding to electrical connections, for example in a circuit), hydraulic relations (e.g. corresponding to conducts that transmit fluxes), logical relations (e.g. corresponding to flows of information), fluid relations (e.g. corresponding to a fluid flow), chemical relations and/or electro-magnetic relations. "Multi-physics" means the physical or logical relations of a multi-physics system can belong to several fields of physics (although this is not necessary the case). A physics or multi-physics system may correspond to the (industrial) product to be manufactured in the real world subsequent to the completion of its virtual design with the present disclosure.

Hence, the one or more character lines of the wireframe can contribute to one or more field of physics, such as electronics, electricity, mechanics, electro-mechanics, fluid mechanics, gravitational mechanics, statistical mechanics, wave physics, statistical physics, particle systems, hydraulic systems, quantic physics, geophysics, astrophysics, chemistry, aerospatial, geomagnetism, electromagnetism, plasma physics.

As previously discussed, the 3D modeled objects being designed comprises a wireframe based on at least one character line. The wireframe may thus be used in a simulation process of the product. FIGS. 1 to 4 are examples of simulations of the physical behavior of the body of a car, where the wireframe of the body of a car comprises character lies that influence the simulated physic or multi-physics system (that is, the body of the car).

Thus, the provided mesh comprises information regarding the wireframe and the one or more character lines, but this information has to be extracted from the mesh.

The provided mesh may be a clean mesh. A clean mesh provides a closed envelope (e.g. no holes in the mesh) and/or a manifold envelope with no overlap, where no vertices are superposed. If the mesh is not clean, it may be repaired upon user action or automatically by using any known method for repairing a mesh.

Figure 7:
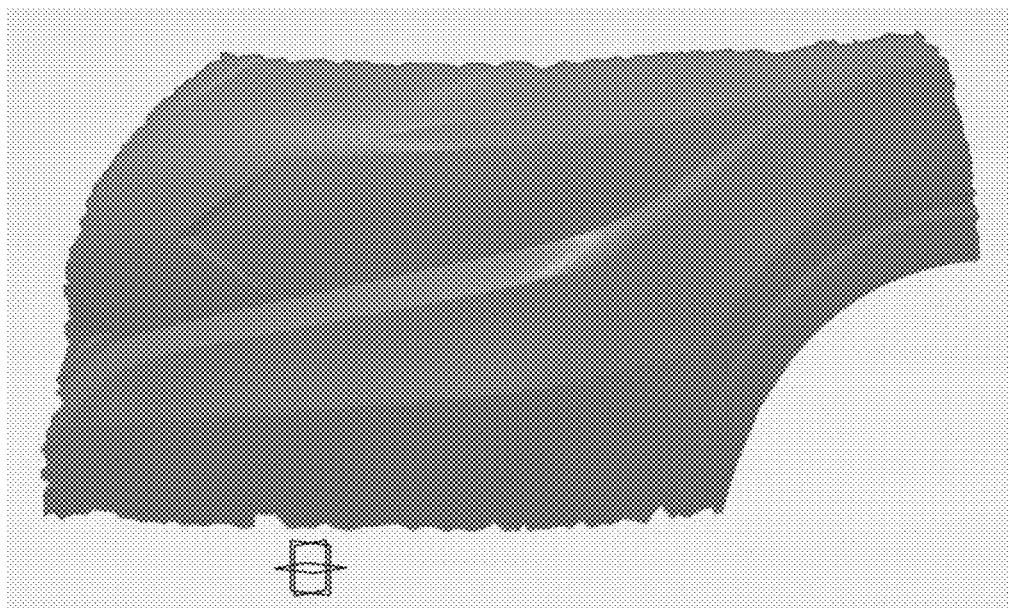
FIG. 7 shows an example of a cleaned mesh obtained from a physical prototype.

FIG. 7 is an illustration of a clean mesh. In this example, the faces of the mesh have been rendered by applying a shade for illustration only. The mesh is clean as there are no holes in the surfaces of the mesh.

Figure 8:
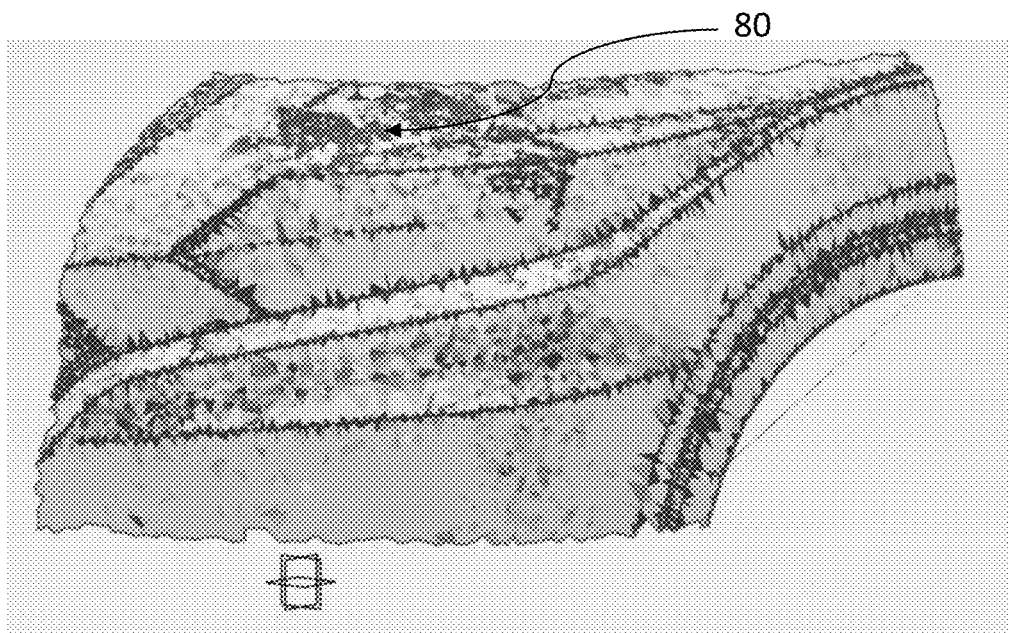
FIG. 8 shows an example of the quality of a mesh obtained from a physical prototype.

FIG. 8 is a representation of the mesh of FIG. 7 with image filtering technology to help assessing the quality of the mesh. A noisy mesh (with less accuracy on the location of each vertex) or a coarse mesh (with larger triangles) shows a mixed grey image instead of a pure black and white image. For example, the area 80 represented in grey presents noise compared to other areas of the mesh.

Next, S20, a segmentation of the provided mesh is computed. A segmented mesh is therefore obtained. Mesh segmentation is the process of decomposing a mesh into smaller and meaningful sub-meshes. The sub-meshes are referred to as region; a region is therefore a part of the provided mesh. As a result of the segmentation, at least two regions are obtained. The regions are distinct regions, this means that no face of the mesh belongs to two different regions. It is to be understood that two regions may have in common vertices and edges, the common edges connecting the common vertices. The edges that are in common between two regions form a boundary polyline. Therefore, at least one boundary polyline is obtained as a result of the segmentation.

Different segmentation techniques may be applied. The purpose of the segmentation being to discover character lines of the provided mesh, the chosen segmentation technique should preferably be able to extract from the lines of the mesh that belong to the external boundaries of the mesh, and/or that are the tautest and longest. The tautest and longest lines may form the streamlines of the mesh.

In examples, the computing of the segmentation of the provided mesh comprises the detection of iso-curvatures lines of the provided mesh and the curvature evolution. Iso-curvature lines are iso-lines that provide a good understanding of the curvature of the mesh. Isolines are lines with a constant characteristic value of the surface of the mesh. Iso-curvature line are lines with a constant curvature value of the surface of the mesh; thus, iso-curvature lines can show and visualize the change of curvature effectively. For a high curvature value, the iso-curvature lines represent the tautest lines of the mesh that are representative of the character lines.

Figure 9:
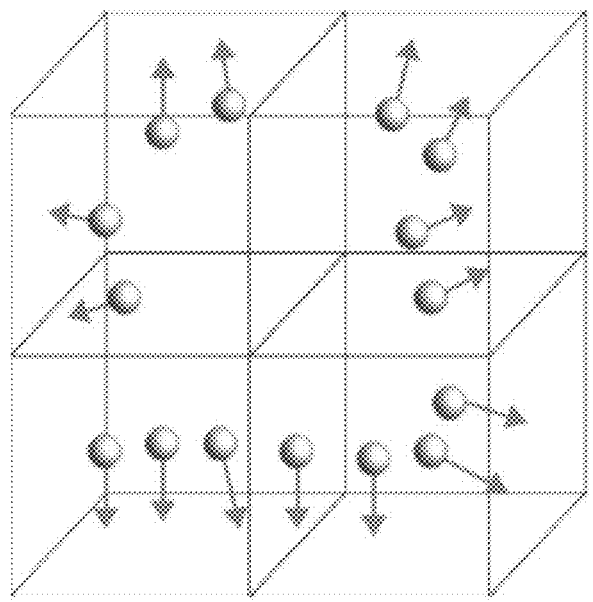
FIG. 9 shows an example of a voxel-based normal clustering.

In an example, one of the techniques to segment the mesh is done by computing a normal clustering of the provided mesh. FIG. 9 is an illustration of the normal clustering process. Each face of the mesh is associated with a normal; this can be performed as known in the art. The cloud of points is associated with a voxel-grid structure. The voxel-grid structure divides the area into few areas following the same normal direction. The vertices of the faces with a normal direction close to the one of a voxel are associated with the voxel. The number of area created depends on the level of clustering. The highest the number of voxels of the grid is, the highest the level of clustering is.

Figure 10:
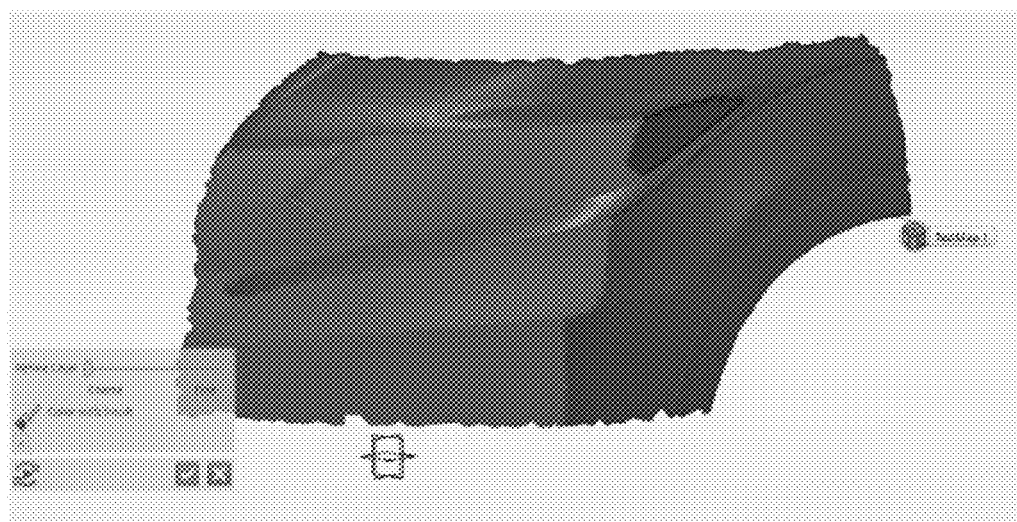
FIGS. 10, 11 and 12 show examples of clustering according to a low, medium and high level of clustering.
Figure 11:
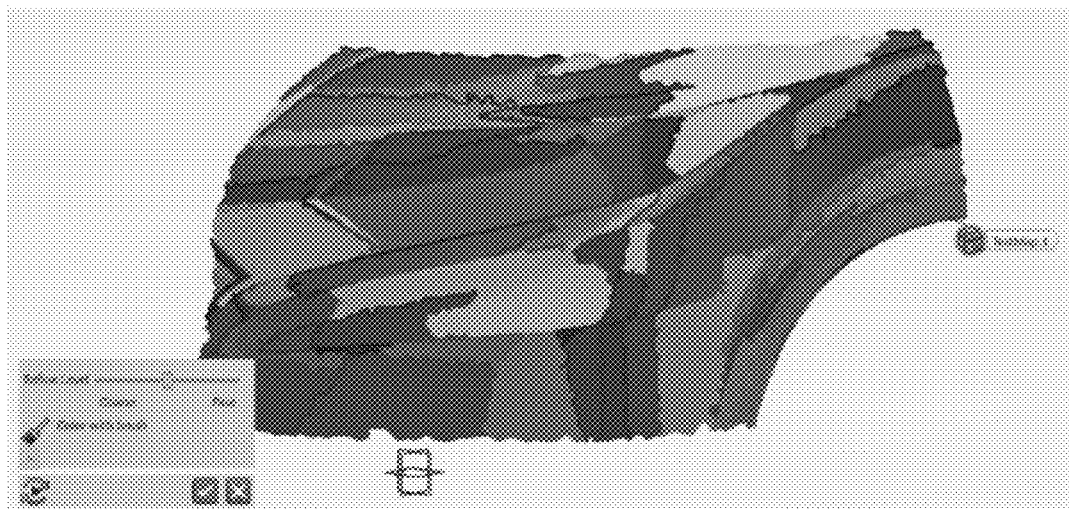
Figure 12:
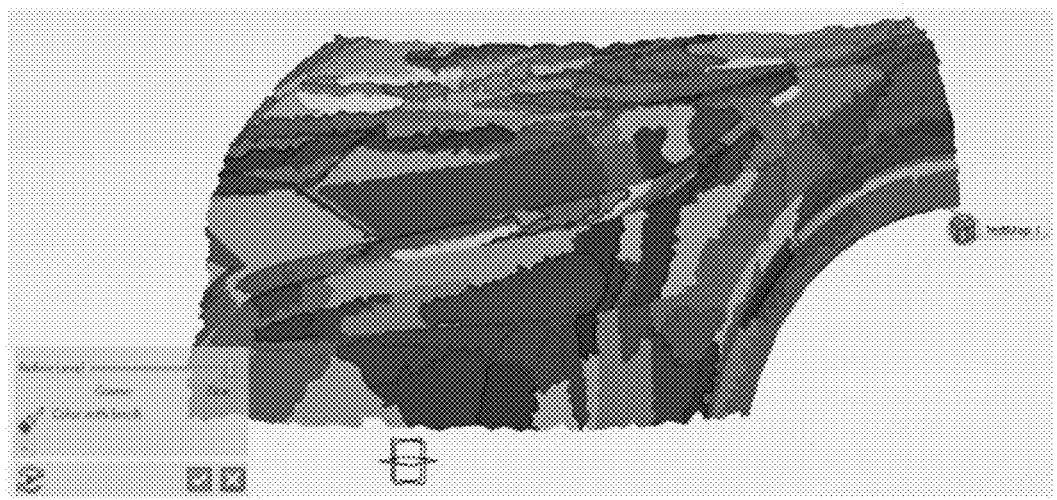

FIGS. 10 to 12 shows examples of segmentation computed for the cleaned mesh of FIG. 7 using a computing a normal clustering. On FIG. 10, the level of clustering is low so that the number of zones obtained is also low. On FIG. 11, the level of clustering has been increased and more regions are identified. FIG. 12 represents a clustering with a maximum of identified regions on the provided mesh. The regions obtained on FIG. 10 have been sub-divided on FIG. 11 into one or more sub-regions, and similarly between FIG. 11 and FIG. 12. The more the mesh is segmented, the more the number boundary polylines between the regions is high.

The user may define an optimized level of clustering as the map may be highly or dimly segmented. At this step of the method, a benefit is to reduce the impact of the quality of the mesh if the level of clustering is not too high. If the mesh is noisy, the segmentation may be kept low so that the flaws of the mesh do not induce the detection and creation of regions that do not wear interesting information, thus breaking the identification of bounding polylines that could be future character lines. A regular change in the normal direction has an impact during the segmentation. For example, a smooth sphere is segmented with the segmentation because the normal vectors cover the whole space. Consequently, the sharp and smooth edges are not reproduced by a low level of clustering. A good level of clustering is a level for which the character lines are reproduced. The user may edit the level of clustering to adjust the result to the objective. Indeed, depending of the 3D Modeling objective, several level of clustering may contemplated:
- sharp modeling where the model is reconstructed as sharp without fillet, the fillets could be added afterwards;
- smooth modeling where fillet regions are included in the segmentation and the fillets are reconstructed;
- Class-A oriented segmentation where not only the fillet regions but also the curvature acceleration regions are isolated and included in the segmentation.

Therefore, the user wants to control and validate the level of clustering and fine-tune the segmentation result according to his/her expectations.

In examples, the segmentation of the provided mesh may comprise the detection of at least one master boundary polyline. A master boundary polyline is a boundary polyline having a higher curvature compared to the other polylines of the provided mesh. The mesh may comprise one or more master boundary polylines. For each area with high or highest curvature value (e.g. extrema of the curvature) of the provided mesh, a boundary polyline may be obtained.

Figure 6:
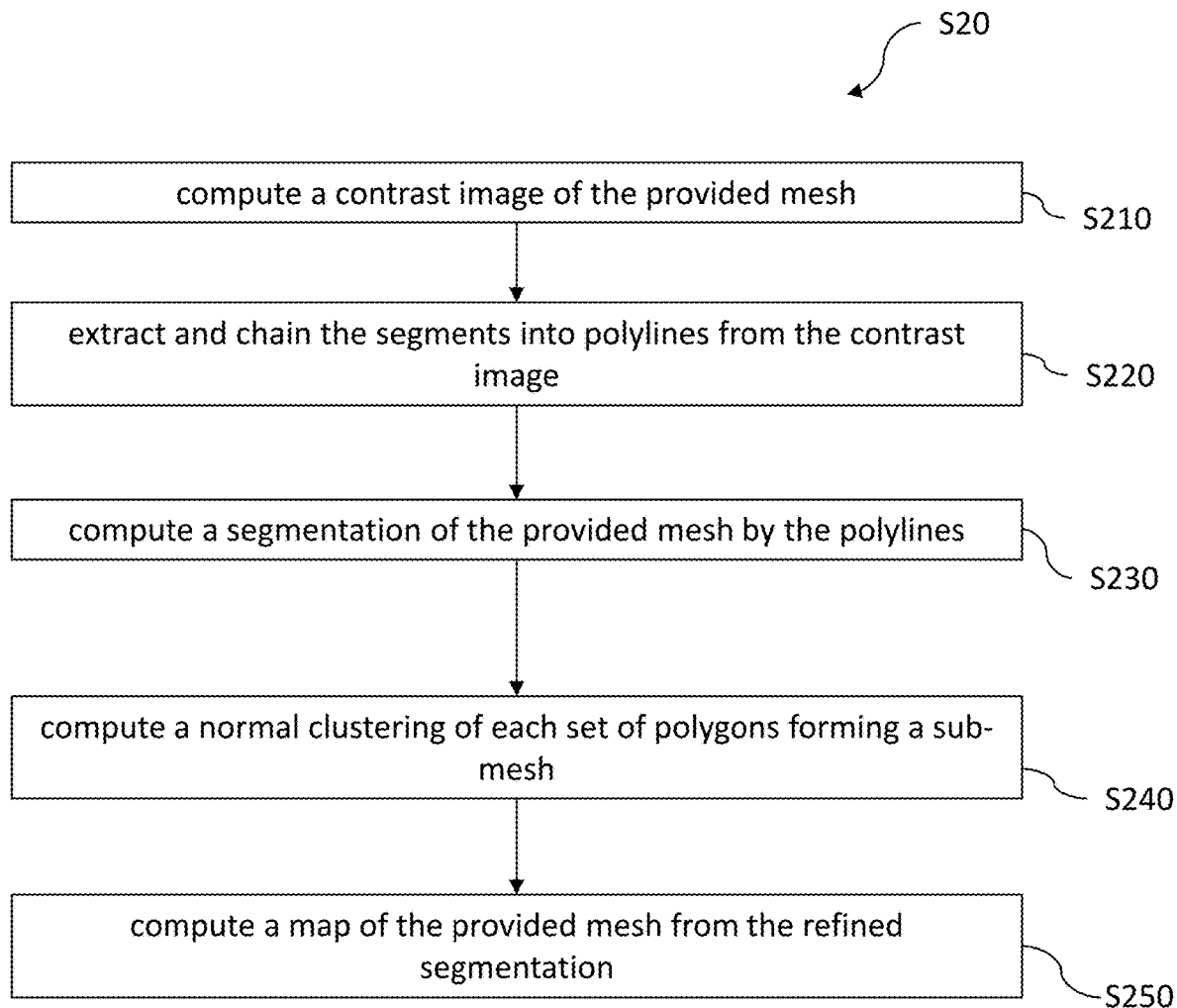
FIG. 6 shows a flowchart of an example of the step S20 of the method.

Referring now to FIG. 6, an example of segmentation of the provided mesh (S20) is discussed. In this example, the segmentation is performed by first computing a contrast image of the provided mesh (S210). The contrast image is also called contrast map. The purpose of the contrast image is to identify extrema of curvature evolution of the provided mesh. Other techniques aiming at identifying the extrema of the curvature evolution can also be used. In examples, an image filter process may use a process to highlight the contrast on an image of the mesh. The intensity value of a pixel may be compared to the mean intensity value of his neighbors. The difference value may be plotted with a greyscale from white (0) to black (highest difference). Here the triangle normal is compared with the mean polygon normal of his neighbors; a neighbor of a polygon is a polygon sharing at least one vertex with the polygon. The difference value may be plotted on a logarithmic greyscale from white (identic normal=plane surface) to black (highest curvature).

In examples, the contrast image may be an adaptive map to analyze the quality of the mesh. The area with low quality might be extracted and isolated in this context to be handled separately from the automation process. By this way, the identification of boundary polylines in low quality areas of the mesh is improved.

Next, S220, the local segments are extracted from the computed contrast image. A local segment is a common edge between a black and a grey triangle, or a common edge where the curvature derivative is extremal. The extracted local segments are chained into the longest possible polylines. Those polylines may be enriched with new polylines in order to define close wires. The new polylines that allow to define close wires are chosen so that the curvature derivative is maximal. All the polylines obtained form a polyline network. In examples, the new polylines may be computed as follows: once the polylines have been obtained, the obtained polylines are propagated in the direction of normal to the curvature to another polyline or a border to assemble them. Closed areas (or closed wire) are thus obtained.

Then, the provided mesh is segmented by the polylines network (S230). Each close wire surrounds a set of triangles which defines a submesh. A triangle may belong to a single submesh. The union of all the sub-meshes corresponds to the initially provided mesh.

Next, S240, the mesh segmentation is refined by applying a normal clustering on each sub-mesh resulting from S230. Referring to back to FIGS. 10 to 12, their respective representation form a map of the computed segmentation: each regions is rendered with a different color. It is to be understood that color is only an example, and the marking may be not visible for the user.

Back to FIG. 6, S250, a map of the segmented mesh is computed, or said otherwise, a map of the provided mesh is computed from the refined segmentation. Thus, the map will comprise the at least two regions and at least one boundary polyline between the at least two distinct regions. The term map refers to a data scheme in which:
- the triangles that belong to a region are marked as belonging to the region;
- similarly, the edges that belong to one of the boundary polylines are marked as belonging to this boundary polyline and refer to the neighboring regions.
- The vertices that belong to several boundary polylines are marked as belonging to this boundary polylines and refer to the joining polylines.

In this map, there is no duplication, the edges (respectively vertices) are common and shared between the neighboring regions (respectively polylines).

Still in reference to the segmentation S20, the segmentation may reveal too much regions (depending on the level of clustering), as already discussed. This may lead to a less efficient identification of the character lines as the number of boundary polylines is higher. In examples, it may be distinguished two phases in the segmentation. A first phase may comprise computing a first segmentation, therefore obtaining at least two first regions from the provided mesh and at least one first boundary polyline between the at least two distinct regions. The at least one first boundary polyline may be referred to as a master boundary polyline of the mesh. The second phase may comprise computing a second segmentation that is performed with a higher optimizing level of segmentation compared to the first segmentation. As a result of the second segmentation, it is obtained at least two second regions from the provided mesh, the at least two second regions belonging to at least one of the at least two first regions and at least one second boundary polyline between the at least two second regions. The at least one second boundary polyline may be referred to as slave boundary polyline of the mesh.

An example of the two phases in the segmentation is now discussed in reference to FIG. 6. As a result of this first phase (S230), at least two first regions from the provided mesh and at least one first boundary polyline between the at least two first regions are obtained. This first segmentation may be performed as previously discussed. The one or more first boundary polylines are referred to as master boundary polylines of the mesh. Master boundary polylines are considered as being the most representative of character lines of the product.

After the first phase, a second segmentation is carried out (S240). The second segmentation is performed with a higher optimizing level of segmentation compared to the first segmentation. As a result of the second segmentation at least two second regions from the provided mesh are obtained. These at least two second regions belong to at least one of the at least two first regions. Still, at least one second boundary polyline between the at least two second regions is obtained. One or more further boundary polylines are discovered. These further boundary polylines are referred to as slave boundary polyline of the mesh.

In examples, the designer may trigger a split or a merge of regions. The user intervenes only if the automatic segmentation process does not discover some character lines.

This may be the case when the mesh is noisy. The user can pick in the zone where he wants to split. A curvature map is then used to split automatically the area following the curvature map. The user can select at least two regions he wants to merge or extend, and the selected region are merged. Interestingly, the user is assisted by the system in the process of splitting a region. The curvature map may be a curvature map of the second order; parts of the mesh with an important curvature can be identified. The curvature map is a curvature texture from high-poly meshes that produces accurate results. The computation of the map is performed as known in the art. Thus, the user can select one of the regions and split the selected region by using a map of curvature of the provided mesh and/or they can select at least two regions and merge them into a single region.

Figure 18:
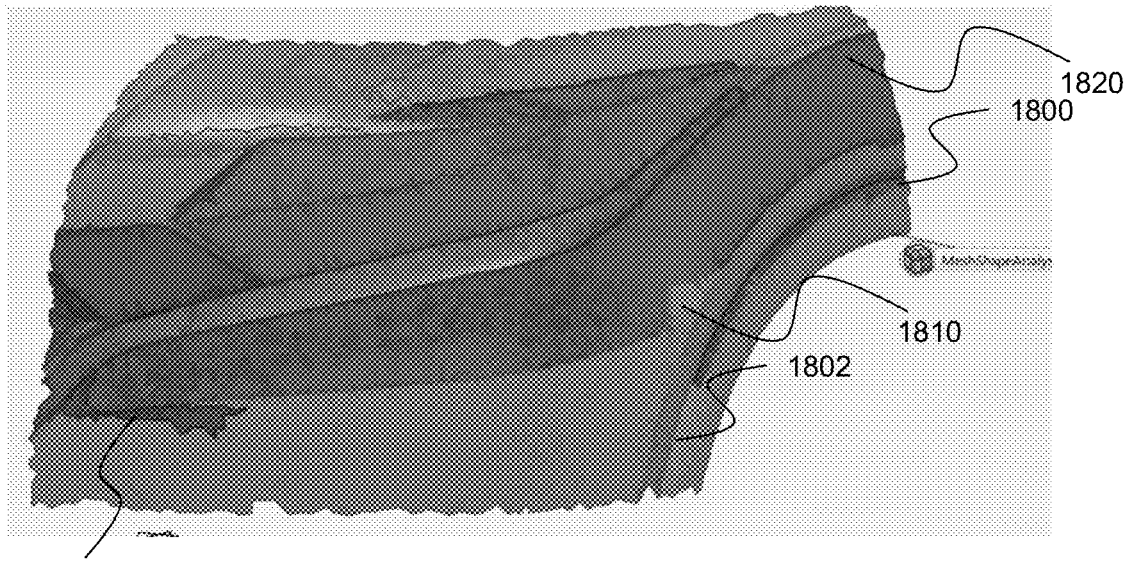
FIG. 18 shows an example of initialization of the segmented map.
Figure 19:
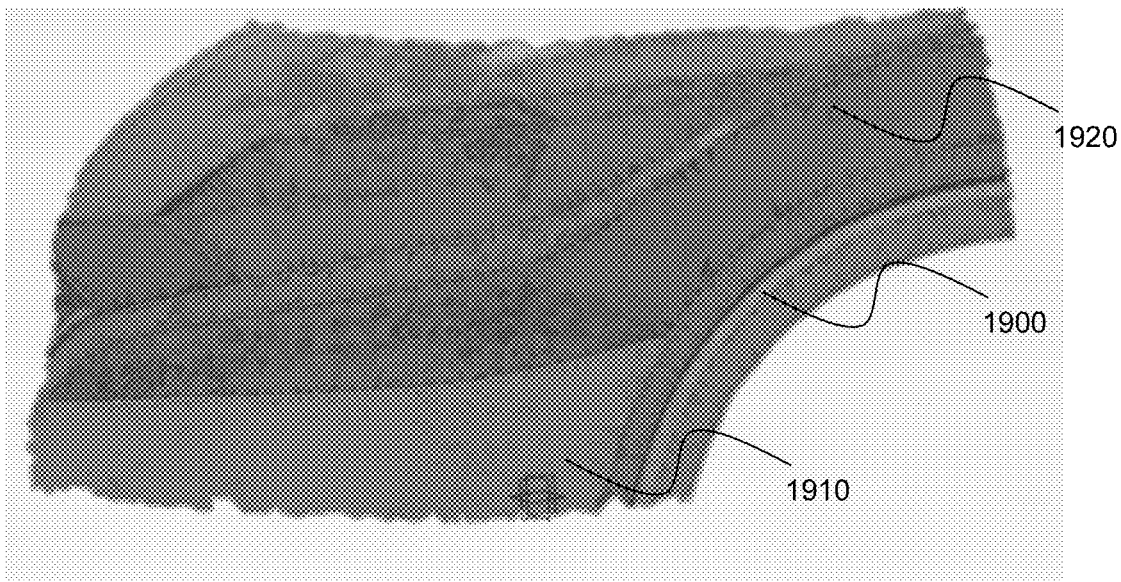
FIG. 19 shows an example of a final segmented map.

FIGS. 18 and 19 illustrated the split and merge of regions. The regions 1800 and 1802 of FIG. 18 have been merged, forming a new region 1900 on FIG. 19. The regions 1810 and 1830 have been split by using the map of curvature, and the new regions discovered have been merged with regions 1810 and 1820, thus forming the news regions 1910 and 1920. Parts of the regions 1830, which has been split, have been merged with the regions 1810 and 1820.

Referring back to FIG. 5, S30. At this step of the method, the wireframe of the provided mesh object is well reproduced. The character lines of the provided mesh are polylines following the sharp and smooth edges. However, the polylines cannot be directly exploited by the product designer and the CAD system performing the method. To that aim, the boundary polylines are transformed into smooth curves. The transformation comprises placing control points on the wireframe in order to control the deviation against the curve and the skeleton. Points may be added until the curve has been situated in a tolerance zone from the mesh. The curves may be created with the less point as possible to obtain a good quality of porcupine along each curve. Interestingly, the mathematical description of the created curves may differ. If the quality of the smooth curve is prevailing, the number of segments and/or the number of control points and/or the degrees of the smooth curve may be minimized. The resulting surfaces rested on these curves would be tighter. This improves the design and the character lines of the object to reproduce the surfaces of the prototype. The local variation of the curves are minimized and the view direction has no impact on the results. Only the quality of the segmented map can have an impact on the obtained curves.

Hence, the transformation (S30) comprises the computing of smooth curves for each boundary line previously computed (S20). The smooth curves represent the character lines of the prototype having been digitalized. The transformation of the set of points into smooth curves is performed as known in the art. The placement of the points on the computed smooth curve may be carried out to minimize deviation against the smooth curve and the provided mesh; this improves the respect of the tolerance of the wireframe with respect to the shapes of the prototype. In addition or alternatively, the number of control points is minimized; the quality of porcupine along each smooth curve is thus improved. In addition or alternatively, the degree of the smooth curve are minimized; this contributes to improve the quality of the smooth curve.

The characteristics of the smooth curve may be selected by the user, or selected by default. Different class of surfaces that will rest on the computed smooth curves can be selected. Class 'A' surfaces can be defined as any surface supported by character lines, and with mathematically G2 or even G3 curvature continuity to one another. Curvature continuity means the continuity between the surfaces sharing the same boundary. Curvature continuity means that at each point of each surface along the common boundary has the same radius of curvature and therefore the boundaries have been blended so no physical joint is present or visible. The class 'A' surfaces have continuous curvatures with no undesirable waviness.

The class 'A' surfaces are predominantly used in the automotive industry on all visible exterior surfaces (ex; body panels, bumper, grill, lights etc.) and all visible surfaces of see-touch & feel parts in interior (ex: Dashboard, seats, door pads etc.). This can also include covers in the engine compartment, mud flaps, trunk panels and carpeting. Class 'A' surfaces are also used in the High-Tech industry, and Consumer goods as well. In the product design realm, Class 'A' surfacing can be applied to such things like housing for industrial appliances that are injection molded, home appliances, plastic packaging defined by highly organic surfaces, toys or furniture. The Aerospace also uses class 'A' surfaces, e.g. when designing interiors like bezels for air vents and lights, interior roof storage racks, seats and cockpit area, and so on.

Class B and C surfaces may also be used. They have lower quality, less continuity level between neighboring surfaces. Any surface supported by character lines have mathematically G0 or G1 curvature continuity to one another.

With G0 continuity, the distance between each point of the edges of two neighboring patches must comply with the following limits:
For class A: no more than 0.01 mm;
For class B: no more than 0.02 mm;
For class C: no more than 0.05 mm.

With G1 continuity (also referred to as tangent continuity), the angle between the tangents to the surface on the edges of two neighboring patches must comply with the following limits:
For class A: no more than 6' (0.1°);
For class B: no more than 12' (0.2°);
For class C: no more than 30' (0.5°).

With G2 continuity (also referred to as curvature continuity), the control parameter is the patch curvature along its contour. The curvature must comply with the following limits:
Class A surfaces must have coincident curvature at least every 100 mm of contour of two neighboring patches;
Class B and C have no applicable rule. Points of maximum curvature or inflection are only allowed along patch contours of Class A surfaces.

Figure 20:
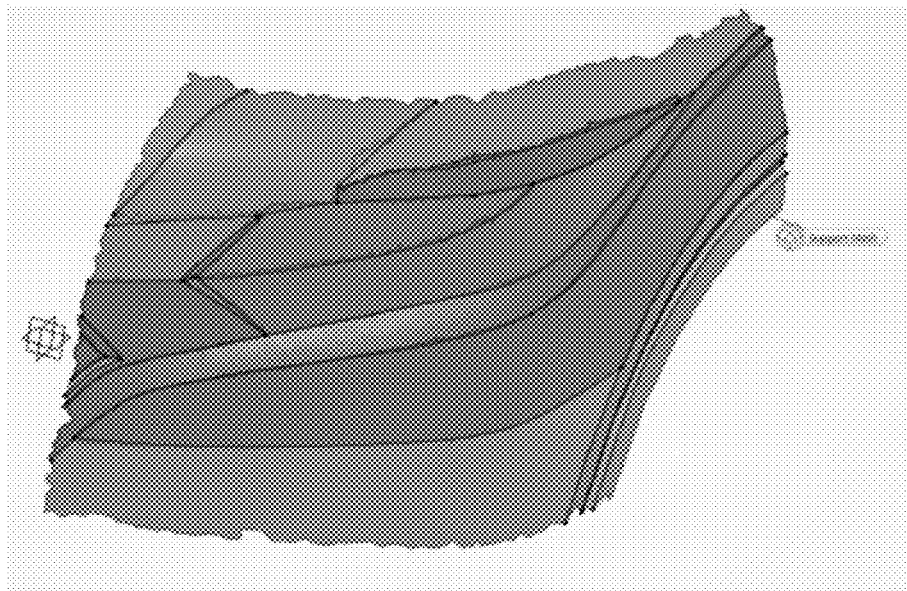
FIG. 20 shows an example of an automatic curve generation.
Figure 21:
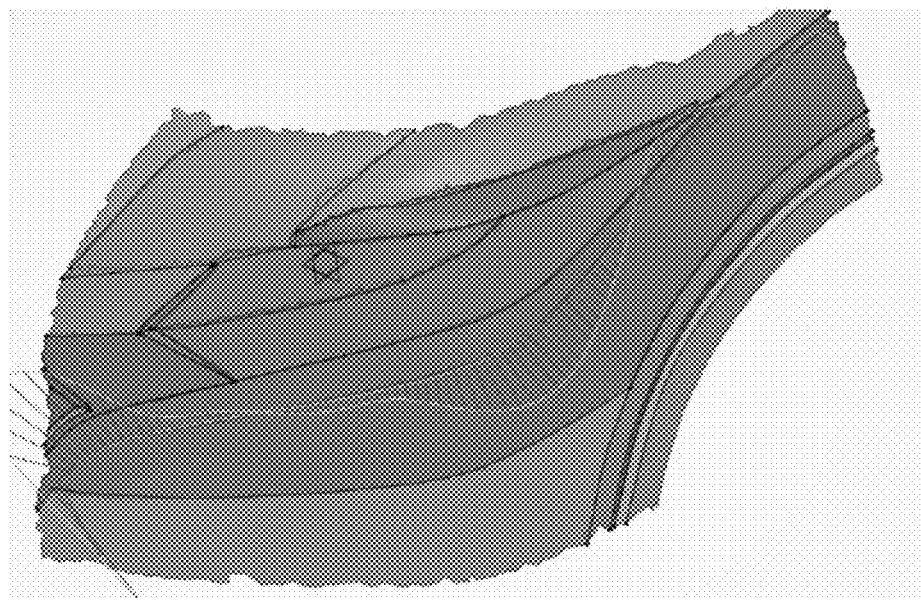
FIG. 21 shows an example of porcupine of a curve from the automatic generation.

FIG. 20 is a representation of the transformation of the boundary polylines of the mesh of FIG. 19 into smooth curves. The automatically generated smooth curves are taut without wavering so that they are good representation of the character lines of the provided mesh. FIG. 21 is a representation of the porcupine of a character line from the automatic generation. The set of smooth curves forms the wireframe of the 3D modeled object that comprises character lines.

Next, S40, a network of the at least one character line is computed. The term network means that the character lines forming the wireframe are interconnected so that each endpoint of a smooth curve is connected to at least one other smooth curve. The network of connected smooth curves (that is, the network of character lines) forms the wireframe of the 3D modeled object. The action of connecting an endpoint of a smooth curve is referred to as snapping In examples, the construction (computing) of the network may rely on the definition of a master curve and a slave curve. The definition of the master and slave curves relies on the definition of the master and slave boundary polylines may be performed as discussed in reference to the two phases in the segmentation process. A slave curve is obtained by the computing of smooth curve of a slave boundary polyline. A master curve is obtained by the computing of smooth curve of a master boundary polyline. The extremity of the slave curve is slightly adjusted to be located on the master curve and is connected to the master curve. For instance, if the master curve is deformed, the slave curve extremity follows. Thus, the at least one first boundary polyline issued from the first segmentation is favored. This improves the preservation of the character lines forming the wireframe of the provided 3D mesh.

In examples, a set of master smooth curves that are the longest smooth curves is created. The smooth curves of the master set are those on which the other smooth curve will be connected if at least one endpoint of a smooth curve is not connected to another one. When a smooth curve has to be connected, the closest smooth curve among the smooth curves of the master set may be selected. A distance may be used for selecting the closest smooth curve, e.g. an Euclidian distance or a geodesic distance.

The endpoint of the smooth curve to be connected is moved to the minimum distance point on the master curve.

In an example, the master set of smooth curves comprises the master smooth curves of the wireframe. Master smooth curves are those obtained after the transformation of master boundary polylines of the mesh. Master smooth curves are considered as being the most representative of character lines of the product. A first iteration aiming to connect the curves of this master set is performed. Within this set, the master of the two curves for each connection is the longest curve. Then a second iteration is performed with the slave smooth curves (those obtained after the transformation of slave boundary polylines into smooth curves). The slave curves with at least one endpoint not connected to a smooth curve will be snapped preferably to one of the master smooth curve. The closest master smooth curve among the master smooth curves may be selected. A distance may be used for selecting the closest smooth curve, e.g. an Euclidian distance or a geodesic distance. In the event a slave smooth curve remains not connected after this second iteration, a process similar to the one described above may apply within the slave smooth curves set.

Hence, the system calculates automatically the master curves on which the other curves could snap. The aim is to favor the long taut curves. In this context, the creation of the master long curves may precede the creation of the no master curves snapped on the master curves. Again, the first boundary polylines (now transformed into master curves) issued from the first segmentation are favored.

In an example, the point of snap of a slave curve may be moved along the master smooth curve by a simple edit. It is reminded that the designer may want to take control and adjust or fine-tune the network by manual edition.

Figure 22:
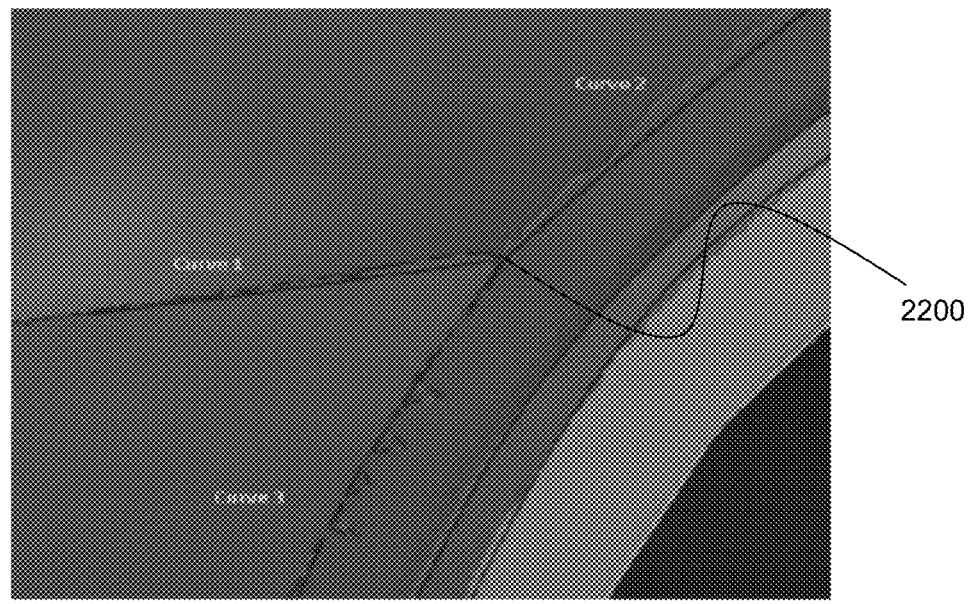
FIG. 22 show an example of a wireframe with no master curve.

FIG. 22 shows an example where none of the three curves (curve 1, curve 2, curve 3) is a master curve. The three curves are interconnected with their respective endpoints 2200 and minimum continuity (G0) at this point.

Figure 23:
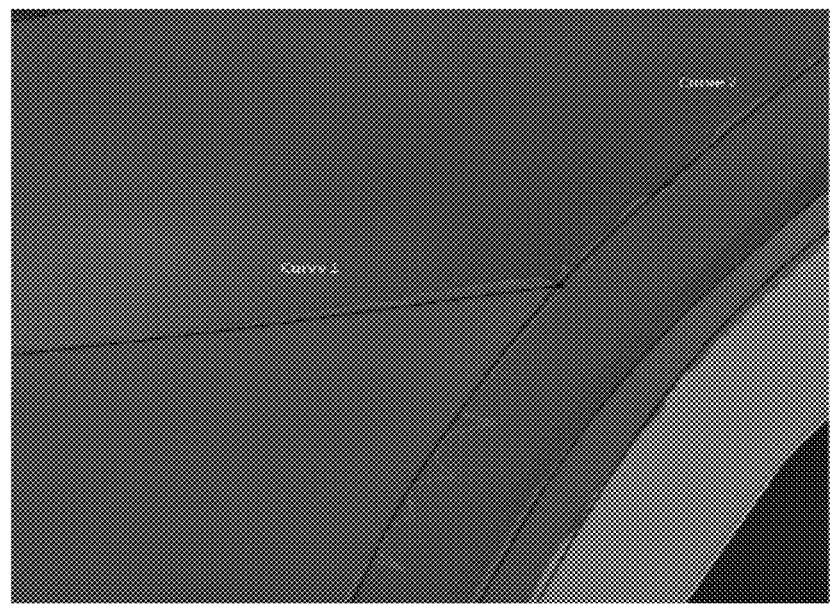
FIG. 23 show an example of the wireframe of FIG. 22 with a master curve.

FIG. 23 illustrates an example where the curve 2 is master. The endpoint of the slave curve 1 is snapped to the master curve 2. We keep the full continuity between the two parts of the curve 2.

The wireframe of the 3D modeled is now available for further design operations. In examples, an assembly of surfaces is computed based on the wireframe for the 3D modeled object. In addition, the system may also compute continuity constraints for the 3D modeled object. To generate the surfaces from the wireframe, a continuity (e.g. G0: simple continuity, or G1: tangency continuity) may be associated to each common border curve between two neighboring zones which will be respected by the generated surfaces. Continuities are provided to the user after geometric analysis of the concurrent curves in a node of the network. The user may be offered the possibility to degrade the provided continuities, e.g. from G1 to G0.

Figure 13:
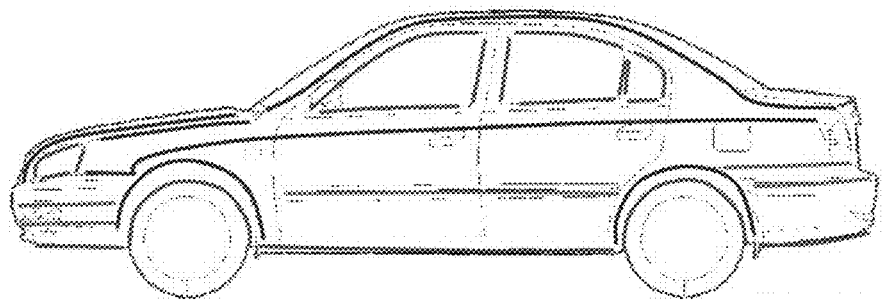
FIGS. 13, 14, 15, 16 and 17 show examples of character lines extracted from the mesh of the prototype.
Figure 14:
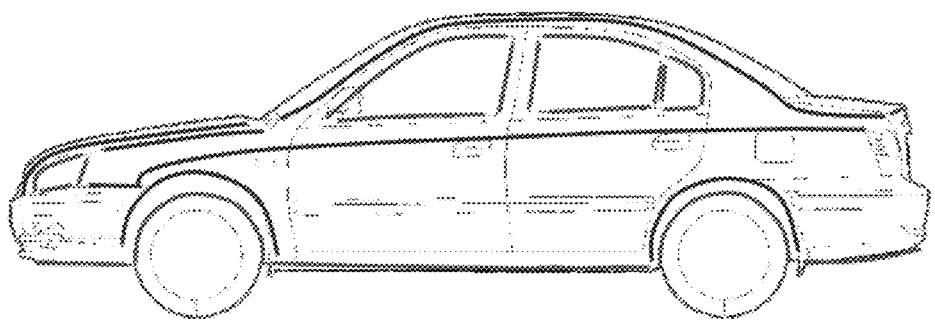
Figure 15:
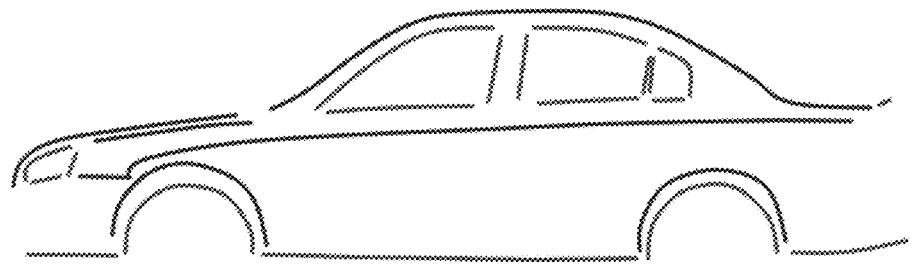
Figure 16:
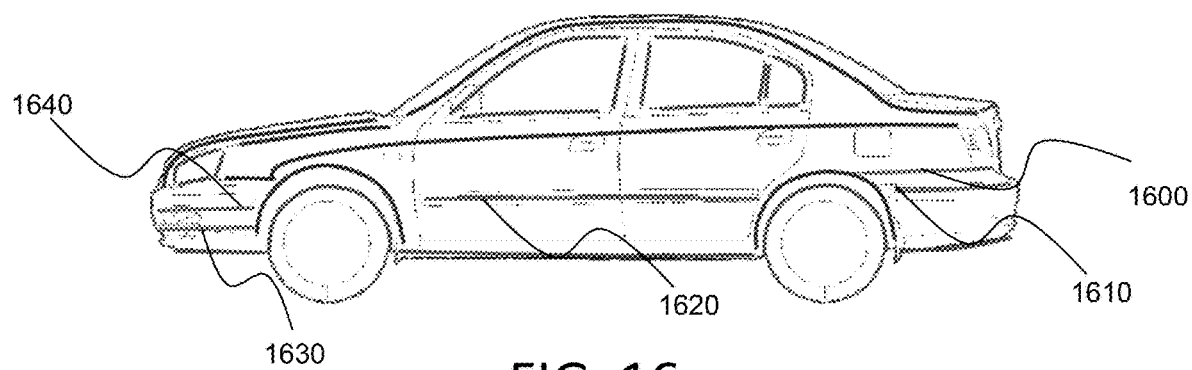
Figure 17:
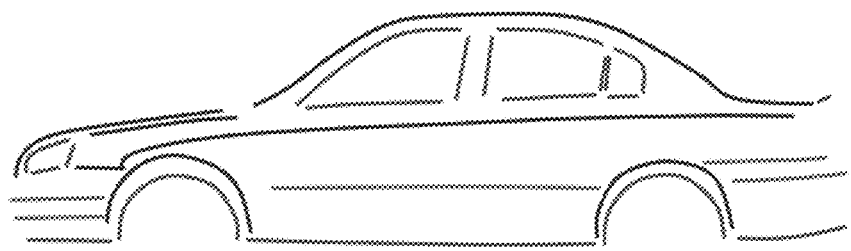

In reference to FIGS. 13 to 17, an example of computing a map of segmentation obtained from the segmentation (S20) is now discussed. FIG. 13 represents the character lines of the prototype (the mock-up) being digitalized, e.g. by a laser scanning producing a cloud of points. FIG. 14 illustrate the master curves on the prototype to be detected. A first segmentation (S230) is performed for obtaining the external and internal boundaries polylines and other main character lines. These lines are in practice the longest and tautest lines. FIG. 15 shows the boundary polylines extracted from the mesh. FIG. 16 shows the remaining character lines 1600, 1610, 1620, 1630, 1640 of the mesh to be extracted. These remaining character lines are slave boundary polylines. These slave polylines represent important details of the mesh and are local polylines; in practice they are connected to the master polylines. A second segmentation is performed with a higher level of clustering, leading to a refining of the regions detections as a result of the first segmentation.

The invention claimed is:

1. A computer-implemented method for designing a 3D modeled object of a physical prototype of a product, the 3D modeled object including a wireframe based on at least one character line, the method comprising:
   obtaining a mesh of the 3D modeled object;
   computing a segmentation of the obtained mesh, therefore obtaining at least two regions from the obtained mesh and at least one boundary polyline between the at least two regions;
   transforming each of the at least one boundary polyline in at least one character line; and
   computing a network of the at least one character line, the network of the at least one character line forming the wireframe of the 3D modeled object,
   wherein the computing of the segmentation further comprises:
   computing a first segmentation, therefore obtaining:
   at least two first regions from the obtained mesh, and
   at least one first boundary polyline between the at least two first regions;
   computing a second segmentation that is performed with a higher optimizing level of segmentation compared to the first segmentation, therefore obtaining:
   at least two second regions from the obtained mesh, the at least two second regions belonging to at least one of the at least two first regions, and
   at least one second boundary polyline between the at least two second regions,
   wherein a region is a part of the obtained mesh and a boundary polyline between at least two regions is formed by the edges that are in common between at least two regions of the at least two regions;
   wherein computing the segmentation of the obtained mesh further comprises:
   detecting at least one master boundary polyline of the obtained mesh, the detection of the at least one master boundary polyline comprising:

computing a contrast map of the mesh by applying an image filtering process on the mesh;
computing a curvature evolution and identifying an extrema of this curvature evolution; and
computing the at least one master boundary polyline by chaining segments resulting from previous computation.

2. The computer-implemented method of claim 1, wherein the computing the network further comprises:
selecting the at least one first boundary polyline;
connecting at least one second smooth curve computed from one second boundary polyline to a first smooth curve computed from the selected at least one first boundary polyline by performing a snap operation,
wherein the snap operation favors the first smooth curve by adjusting an extremity of the second smooth curve to be located on the first smooth curve.

3. The computer-implemented method of claim 1, wherein the computing the segmentation of the obtained mesh further comprises a refined segmentation by computing a normal clustering on each region of the mesh.

4. The computer-implemented method of claim 1, further comprising, after the computing a segmentation of the obtained mesh:
selecting a region of the at least two regions and splitting the selected region by using a map of curvature of the obtained mesh; and/or
selecting at least two regions and merging them into a single region.

5. The computer-implemented method of claim 4, wherein the transforming further comprises computing a smooth curve for each of the at least one boundary polyline.

6. The computer-implemented method of claim 5, further comprising:
placing control points of the smooth curve,
wherein the placing is performed to minimize:
deviation against the smooth curve and the obtained mesh; and/or
a number of control points; and/or
a degree of the smooth curve.

7. The computer-implemented method of claim 1, further comprising:
computing an assembly of surfaces based on the wireframe, and continuity constraints for the 3D modeled object.

8. A non-transitory computer readable storage medium having recorded thereon a computer program including instructions allowing a computer to perform a method for designing a 3D modeled object of a physical prototype of a product, the 3D modeled object including a wireframe based on at least one character line, the method comprising:
obtaining a mesh of the 3D modeled object;
computing a segmentation of the obtained mesh, therefore obtaining at least two regions from the obtained mesh and at least one boundary polyline between the at least two regions;
transforming each of the at least one boundary polyline in at least one character line; and
computing a network of the at least one character line, the network of the at least one character line forming the wireframe of the 3D modeled object,
wherein the computing a segmentation of the mesh further comprises:
computing a first segmentation, therefore obtaining:
at least two first regions from the obtained mesh, and
at least one first boundary polyline between the at least two first regions; and computing a second segmentation that is performed with a higher optimizing level of segmentation compared to the first segmentation, therefore obtaining:
at least two second regions from the obtained mesh, the at least two second regions belonging to at least one of the at least two first regions, and
at least one second boundary polyline between the at least two second regions,
wherein a region is a part of the obtained mesh and a boundary polyline between at least two regions is formed by the edges that are in common between at least two regions of the at least two regions;
wherein computing the segmentation of the obtained mesh further comprises:
detecting at least one master boundary polyline of the obtained mesh, the detection of the at least one master boundary polyline comprising:
computing a contrast map of the mesh by applying an image filtering process on the mesh;
computing a curvature evolution and identifying an extrema of this curvature evolution; and
computing the at least one master boundary polyline by chaining segments resulting from previous computation.

9. The non-transitory computer readable storage medium of claim 8, wherein the computing the network further comprises:
selecting the at least one first boundary polyline;
connecting at least one second smooth curve computed from one second boundary polyline to a first smooth curve computed from the selected at least one first boundary polyline by performing a snap operation,
wherein the snap operation favors the first smooth curve by adjusting an extremity of the second smooth curve to be located on the first smooth curve.

10. The non-transitory computer readable storage medium of claim 8, wherein the computing a segmentation of the obtained mesh further comprises a refined segmentation by computing a normal clustering on each region of the mesh.

11. The non-transitory computer readable storage medium of claim 8, further comprising, after the computing a segmentation of the obtained mesh:
selecting a region of the at least two regions and splitting the selected region by using a map of curvature of the obtained mesh; and/or
selecting at least two regions and merging them into a single region.

12. A system comprising:
a processor coupled to a memory and a graphical user interface, the memory having recorded thereon a computer program for designing a 3D modeled object of a physical prototype of a product, the 3D modeled object including a wireframe based on at least one character line, that when executed by the processor causes the processor to be configured to:
obtain a mesh of the 3D modeled object,
compute a segmentation of the obtained mesh, therefore obtaining at least two regions from the obtained mesh and at least one boundary polyline between the at least two regions,
transform each of the at least one boundary polyline in at least one character line, and
compute a network of the at least one character line, the network of the at least one character line forming the wireframe of the 3D modeled object,
wherein the processor is further configured to compute the segmentation by being configured to:

compute a first segmentation, therefore obtaining:
  at least two first regions from the obtained mesh, and
  at least one first boundary polyline between the at least two first regions,
compute a second segmentation that is performed with a higher optimizing level of segmentation compared to the first segmentation, therefore obtaining:
  at least two second regions from the obtained mesh, the at least two second regions belonging to at least one of the at least two first regions, and
  at least one second boundary polyline between the at least two second regions,
wherein a region is a part of the obtained mesh and a boundary polyline between at least two regions is formed by the edges that are in common between at least two regions of the at least two regions;
wherein the processor is further configured to compute the segmentation of the obtained mesh by being further configured to:
detect at least one master boundary polyline of the obtained mesh by being configured to:
  compute a contrast map of the mesh by applying an image filtering process on the mesh
  compute a curvature evolution and identifying an extrema of this curvature evolution; and
  compute the at least one master boundary polyline by chaining segments resulting from previous computation.

13. The system of claim 12, wherein the processor is further configured to compute the network by being further configured to:
  select the at least one first boundary polyline, and
  connect at least one second smooth curve computed from one second boundary polyline to a first smooth curve computed from the selected at least one first boundary polyline by performing a snap operation,
  wherein the snap operation favors the first smooth curve by adjusting an extremity of the second smooth curve to be located on the first smooth curve.

* * * * *